(12) United States Patent
Briggs (10) Patent No.: US 9,181,111 B2
(45) Date of Patent: Nov. 10, 2015

(54) METHOD AND APPARATUS FOR PROCESSING FLUIDS

(71) Applicant: Wonder Water Pty Ltd, Carlton North (AU)

(72) Inventor: William Ernest Briggs, Coffs Harbour (AU)

(73) Assignee: Wonder Water Pty Ltd, Victoria (AU)

( * ) Notice: Subject to any disclaimer, the term of this patent is extended or adjusted under 35 U.S.C. 154(b) by 0 days.

(21) Appl. No.: 14/561,145

(22) Filed: Dec. 4, 2014

(65) Prior Publication Data

US 2015/0158745 A1 Jun. 11, 2015

Related U.S. Application Data

(63) Continuation of application No. 14/089,282, filed on Nov. 25, 2013, now abandoned, which is a continuation of application No. 12/972,379, filed on Dec. 17, 2010, now abandoned, which is a continuation of application No. 10/575,865, filed as application No. PCT/AU2004/000211 on Feb. 21, 2004, now abandoned.

(30) Foreign Application Priority Data

Feb. 24, 2003 (AU) ................................ 2003900818
Sep. 30, 2003 (AU) ................................ 2003905305

(51) Int. Cl.
*C02F 1/46* (2006.01)
(Continued)

(52) U.S. Cl.
CPC .............. *C02F 1/461* (2013.01); *B01D 53/326* (2013.01); *C02F 1/4606* (2013.01); *C02F 1/4618* (2013.01); *C02F 1/4678* (2013.01); *C02F 1/46104* (2013.01); *C02F 1/46109* (2013.01); *C02F 2001/46123* (2013.01); *C02F 2103/008* (2013.01); *C02F 2103/026* (2013.01); *C02F 2103/42* (2013.01); *C02F 2201/4611* (2013.01); *C02F 2201/46145* (2013.01)

(58) Field of Classification Search
USPC ........................ 205/701, 743; 204/225, 228.3
See application file for complete search history.

(56) References Cited

U.S. PATENT DOCUMENTS

| 5,221,444 A | 6/1993 | Silveri |
| 5,456,812 A | 10/1995 | Chak |
| 5,928,481 A | 7/1999 | Briggs |

(Continued)

FOREIGN PATENT DOCUMENTS

WO 95/31404 A1 11/1995

*Primary Examiner* — Arun S Phasge
(74) *Attorney, Agent, or Firm* — Sughrue Mion, PLLC (57) ABSTRACT

The present invention relates generally to the processing of fluids and/or their carriers. Carriers may comprise pipes, tubes and the like or reservoirs for the distribution and/or storage of fluids. In one form, the present invention relates to a method and apparatus that is suitable for use in the treatment of various fluids, such as water, by introducing at least one chemically active metal into the water and its carriers for disinfection of the water in a controlled manner. The invention also relates to a biasing means for displacement of an electrode arrangement to allow for the introduction of ions into a fluid at a controlled or easily monitored rate that is commensurate with the amount of fluid flow.

17 Claims, 5 Drawing Sheets

(51) Int. Cl.
*C02F 1/461* (2006.01)
*B01D 53/32* (2006.01)
*C02F 1/467* (2006.01)
*C02F 103/00* (2006.01)
*C02F 103/02* (2006.01)
*C02F 103/42* (2006.01)

(56) References Cited

U.S. PATENT DOCUMENTS 6,342,150 B1    1/2002   Sale et al.
6,860,976 B2 *   3/2005   Andrews et al. ............. 204/225
2003/0164308 A1   9/2003   Schlager et al.

* cited by examiner

METHOD AND APPARATUS FOR PROCESSING FLUIDS

This is a Continuation of U.S. application Ser. No. 14/089,282, filed Nov. 25, 2013 and now abandoned, which is a Continuation of U.S. application Ser. No. 12/972,379, filed Dec. 17, 2010 and now abandoned, which is a Continuation of U.S. application Ser. No. 10/575,865, filed Apr. 17, 2006 and now abandoned, which is a §371 National Stage Application of International Application No. PCT/AU2004/000211 filed Feb. 21, 2004, claiming priority based on Australian Patent Application Nos. 2003-900818, filed Feb. 24, 2003, and 2003-905305, filed Sep. 30, 2003, the contents of all of which are incorporated herein by reference in their entirety.

FIELD OF INVENTION

The present invention relates generally to the processing of fluids and/or their carriers. Carriers may comprise pipes, tubes and the like or reservoirs for the distribution and/or storage of fluids. In particular, the present invention relates to a method and apparatus that is suitable for use in the treatment of water by introducing at least one chemically active metal, for example, antimicrobial forms of metal into the water and its carriers for disinfection of the water in a controlled manner, and it will be convenient to hereinafter describe the invention in relation to that application. It should be appreciated, however, that the present invention is not limited to that application, only. Notably, the present invention is suitable for use in the processing of other fluids, for example, milk, starches, syrups, fruit juices, biological fluids from animals or humans, liquid fossil fuels and the like. In one particular aspect the present Invention is also suitable for use as a method and means for fluid flow recognition or determination.

BACKGROUND OF INVENTION

In the context of the present invention, it is to be taken that the term "fluid" applies to any material that displays liquid-like or gas-like behaviour or physical properties.

The treatment of fluids by disinfection, for example, is an important process enabling the safe and efficient use and/or consumption of these fluids in industrial and domestic environments. For example, the ability to disinfect water for general consumption by animals and/or humans including drinking and recreational use is paramount. An example application of such treated water includes production liquid for the preservation of fresh cut flowers. When treating fluids it is also critical that the flow of the given fluid is determined and/or controlled.

Prior art techniques used for disinfecting fluids, such as for example in Australian Patent 53032/98 (735166), Australian Patent 11859/97 (702918) and Australian Patent 24394/95 (685630), make use of the ability of silver ions to effectively destroy micro-organisms such as bacteria and viruses. However, in these prior art systems, the silver that is being introduced into a given fluid requires sophisticated electronic equipment for either monitoring the amount or dose of silver being introduced or monitoring the volumetric flow of fluid to be treated. Moreover, regulatory authorities throughout the world now stipulate their own varying individual maximum levels of silver that may be added to fluids for their treatment. These various regulations make it difficult and expensive to control the amount of silver to be released into a given flow of fluid.

Other prior art systems, such as disclosed in DE 4107708, attempt to accurately monitor fluid flow. These systems require the use of delicate on/off flow switches and are therefore, expensive. Generally, the flow switches of prior art systems are made using glass encased reed switches and magnets of differing types. Reed switches, in particular, are easily cracked and as a result may fail to perform. Furthermore, the circuits required to control these systems often fail especially where corrosion occurs as would be expected when placed in close proximity or contact with the various fluids being treated, in the event of these failures, the prior art systems cannot provide for regulated introduction of sliver into a fluid.

Prior art silver disinfection systems may also have a tendency to cause an overdose of silver into the fluid. Notwithstanding the toxic effects of excessive silver consumption, a further problem associated with silver overdosing has been shown, namely, de-oxygenation. When excessive amounts of silver are introduced into a body of fluid the excess silver will absorb the available free oxygen and may use the absorbed oxygen to destroy anaerobic micro-organisms by the process of oxidation leaving the fluid in a de-oxygenated form. The de-oxygenated fluid then becomes an environment that is conducive to the multiplication and resultant re-infection of micro-organisms. This re-infection is also assisted by the fact that dissolved silver in a relatively short time, plate out to the walls containing the fluid or, being heavy will fall out of suspension removing the active silver from the fluid. Thus, there is a need to maintain a correct balance of silver concentration for successful disinfection.

Prior art systems such as that disclosed in Australian Patent 53032198 (735160) have provided a solution to the problem of plating by producing suspended silver particles instead of silver ions. Such particles are not soluble and cannot plate out and, in turn, as the particles are of pure silver and not silver ions forming silver salts, they may not produce toxic effects in high doses. However, complex circuits are required to produce pure silver particles and this is a disadvantage, particularly when a readily useful and easily accessible means of disinfection is required in the market. Furthermore, the lack of plating displayed by silver particles is a disadvantage when it is desirable to treat the surface or walls of a fluid carrier to produce, for example, a bacteriostatic coating of silver preventing biofilm build up.

It is therefore an object of the present invention to provide a method and apparatus, which ameliorates at least one disadvantage of the prior art arrangements. It is also an object of the present invention to provide a method and apparatus providing for the control or monitoring of the introduction of chemically active forms of metal into a fluid that may flow at a variable rate. It is also an object of the present invention to provide a method and apparatus for providing control over the plating out effect of an introduced metal on the walls of a fluid carrier.

Any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF INVENTION

In one aspect the present invention provides an apparatus for processing fluid comprising a body defining a fluid flow passage having a fluid inlet and a fluid outlet, the body comprising a first electrode arrangement and a second electrode arrangement displaceable with respect to the first electrode arrangement, the first and second electrode arrangements adapted for connection to a supply of electric current such that fluid within the body forms part of an electrolytic cell providing for a flow of ions between the first and second electrode arrangements; biasing means operatively associated with the second electrode arrangement and adapted to displace the second electrode arrangement against a flow of fluid within the body in order to displace the second electrode arrangement into closer proximity with the first electrode arrangement as the fluid flow rate increases, thereby increasing the flow of ions, and to displace the second electrode arrangement away from the first electrode arrangement as the fluid flow rate decreases, thereby decreasing the flow of ions.

In accordance with another aspect of the present invention, there is provided a method of processing a fluid comprising the steps of providing a body defining a fluid flow passage having a fluid inlet and a fluid outlet, the body comprising a first electrode arrangement and a second electrode arrangement displaceable with respect to the first electrode arrangement, the first and second electrode arrangements adapted for connection to a supply of electric current such that fluid within the body forms part of an electrolytic cell providing for a flow of ions between the first and second electrode arrangements; providing an electric current supply from an electric circuit to the first and second electrode arrangements; passing the fluid through the body such that the displacement of the second electrode arrangement is biased against the flow of fluid within the body in order to displace the second electrode arrangement into closer proximity with the first electrode arrangement as the fluid flow rate increases, thereby increasing the flow of ions, and to displace the second electrode arrangement away from the first electrode arrangement as the fluid flow rate decreases, thereby decreasing the flow of ions.

A further aspect of the present invention provides a method of determining fluid flow comprising the steps of providing a body defining a fluid flow passage having a fluid inlet and a fluid outlet, the body comprising a first electrode arrangement and a second electrode arrangement displaceable with respect to the first electrode arrangement, the first and second electrode arrangements adapted for connection to a supply of electric current such that fluid within the body forms part of an electrolytic cell providing for a flow of ions between the first and second electrode arrangements; providing an electric current supply from an electric circuit to the first and second electrode arrangements; passing the fluid through the body such that the displacement of the second electrode arrangement is biased against a flow of fluid within the body in order to displace the second electrode arrangement into closer proximity with the first electrode arrangement as the fluid flow rate increases, thereby increasing the flow of ions, and to displace the second electrode arrangement away from the first electrode arrangement as the fluid flow rate decreases, thereby decreasing the flow of ions; determining the fluid flow rate by measuring either one or both of an ion currant density between the first and second electrode arrangements, and a relative displacement of the first and second electrode arrangement.

The present invention still further provides biasing means adapted for controlled operation by the passage of fluid in a fluid passage, the biasing means being operative to displace a first electrode relative to a second electrode, the biasing means comprising a displacement means for displacing the first electrode toward the second electrode proportional to an increase in the rate of flow of fluid in the passage.

The present invention also provides a trigger means operably associated with a biasing means as disclosed herein, the trigger means comprising a first switch means disposed in association with the displacement means, a second switch means adapted to cooperate with the first switch means, in a first position, to form a trigger.

The present invention also provides a trigger means operably associated with an apparatus as disclosed herein, the trigger means comprising a first switch means disposed in association with the second electrode arrangement, a second switch means adapted to cooperate with the first switch means, in a first position, to form a trigger.

In essence, the present invention stems from the realisation that transducing or converting fluid flaw to a biased displacement of at least one electrode arrangement of an electrolytic cell provides a flow of ions, or an ion current density, within the fluid and between electrode arrangements, which corresponds to and is therefore regulated by the flow rate of the fluid. This biased displacement of an electrode arrangement allows for the introduction of ions into a fluid at a controlled or easily monitored rate that is commensurate with the amount of fluid flow. Further, it has been found that, correspondingly, a measurement of the relative displacement of the first and second electrode arrangements and/or the ion current density or rate of ion introduction into the fluid provides a corresponding determination of the fluid flow rate itself. Within an electrolytic cell, forming part of the apparatus in accordance with one embodiment of the present invention, an electric voltage applied between the first and second electrode arrangements will provide a flow of ions within the fluid and between the first and second electrode arrangements that increases with increasing fluid flow rate as the second electrode arrangement moves into closer proximity to the first electrode arrangement and decreases with decreasing fluid flow rate as the second electrode arrangement moves away from the first electrode arrangement.

In preferred embodiments of the method and apparatus for processing a fluid according to the present invention, the rate of introduction of ions into a fluid may be such that the ion flow or ion current density within the processed fluid is regulated in a directly proportional relationship to the fluid flow rate. Further to this, in preferred embodiments, the present invention may provide a directly proportional relationship between the displacement of the electrode arrangements and the fluid flow rate.

In accordance with a preferred embodiment, the first electrode arrangement comprises an electrode fixed relative to the body and the second electrode arrangement comprises two opposed electrodes, mounted within a moveable support, allowing for positioning of the fixed electrode therebetween and wherein, the biasing means comprises a spring connected to the body means. The moveable support may be a piston arrangement comprising a sliding piston. Alternatively, the second electrode may be fixed relative to the first electrode, with the first electrode being moveable. Again, alternatively both electrode may be moveable relative to the body and/or relative to each other.

The ions produced by the fluid processing apparatus may be metal ions emanating from the electrode arrangements during electrolysis and having antimicrobial and plating out properties such that the metal ions plate to fluid contact surfaces of the body. Furthermore, these ions may plate to contact surfaces of a fluid carrier means located or connected beyond the body to form a biostatic film on a number of fluid contact surfaces.

The electrodes may be comprise one or more different metals. Alternatively, each electrode may be made of a different metal, or produce ions of different metals.

Preferably, at least one of the electrode arrangements may comprise silver for producing a flow of silver ions between the electrodes. Any suitable electric circuit may be used for supplying electric current to the electrolytic cell formed within the apparatus in accordance with preferred embodiments of the invention.

In one preferred embodiment, the apparatus of the present invention may further comprise: fluid flow measurement means for determining whether there is actual fluid flow between the inlet and the outlet of the body, and; an electric circuit for supplying electric current to the electrolytic cell may comprise circuit control means for reducing the electric current supplied to the first and second electrode arrangements if there is no actual fluid flow determined by the fluid flow measurement means. The fluid flow measurement means may comprise a flow switch having a magnet and a reed switch.

The electric circuit may be arranged to comprise circuitry for activating a standby mode. It is also possible for the electric circuit to further comprise circuitry for activating en operating mode. Circuit means may be included for increasing an electric current supply to the first and second electrode arrangements in response to a fluid flow condition.

The fluid processing apparatus may further comprise fluid flow determination means comprising an ion current measurement arrangement for measuring the ion current density between the first and second electrode arrangements where the ion current density corresponds to the fluid flow rate. Alternatively, a measurement of the relative displacement of the first and second electrode arrangements may provide a determination of the relative fluid flow rate. In further embodiments the fluid processing apparatus may be calibrated such that the relative displacement of the first and second electrode arrangements provides a determination of the absolute volumetric fluid flow rate.

Either analogue or digital circuit means may be utilised for reducing the electric current supplied to the first and second electrode means if there is no actual fluid flow determined by the fluid flow measurement means. Moreover, as a preferred alternative to the use of flow switch means for measuring actual fluid flow to activate and deactivate the processing apparatus, the electric circuit means in accordance with preferred embodiments of the present invention may comprise circuitry for activating the standby mode and operating mode as mentioned above.

A display may be provided to indicate the activation of the standby mode and/or the activation of the operating mode.

Other aspects and preferred aspects are disclosed in the specification and/or defined in the appended claims, forming a part of the description of the invention.

BRIEF DESCRIPTION OF THE DRAWINGS

Other features and advantages of one or more preferred embodiments of the present invention will be readily apparent to one of ordinary skill in the art from the following written description with reference to and, used in conjunction with, the accompanying drawings, in which.

DESCRIPTION OF PREFERRED EMBODIMENT

An exemplary embodiment of the present invention resides in its use for the processing of a fluid by means of silver ion disinfection for the disinfection of a flowing fluid in conjunction with making use of the benefit of the plating out properties of silver ions to the surface of a fluid carrier comprising, for example, a body in the form of a chamber for fluid flow.

Figure 1:
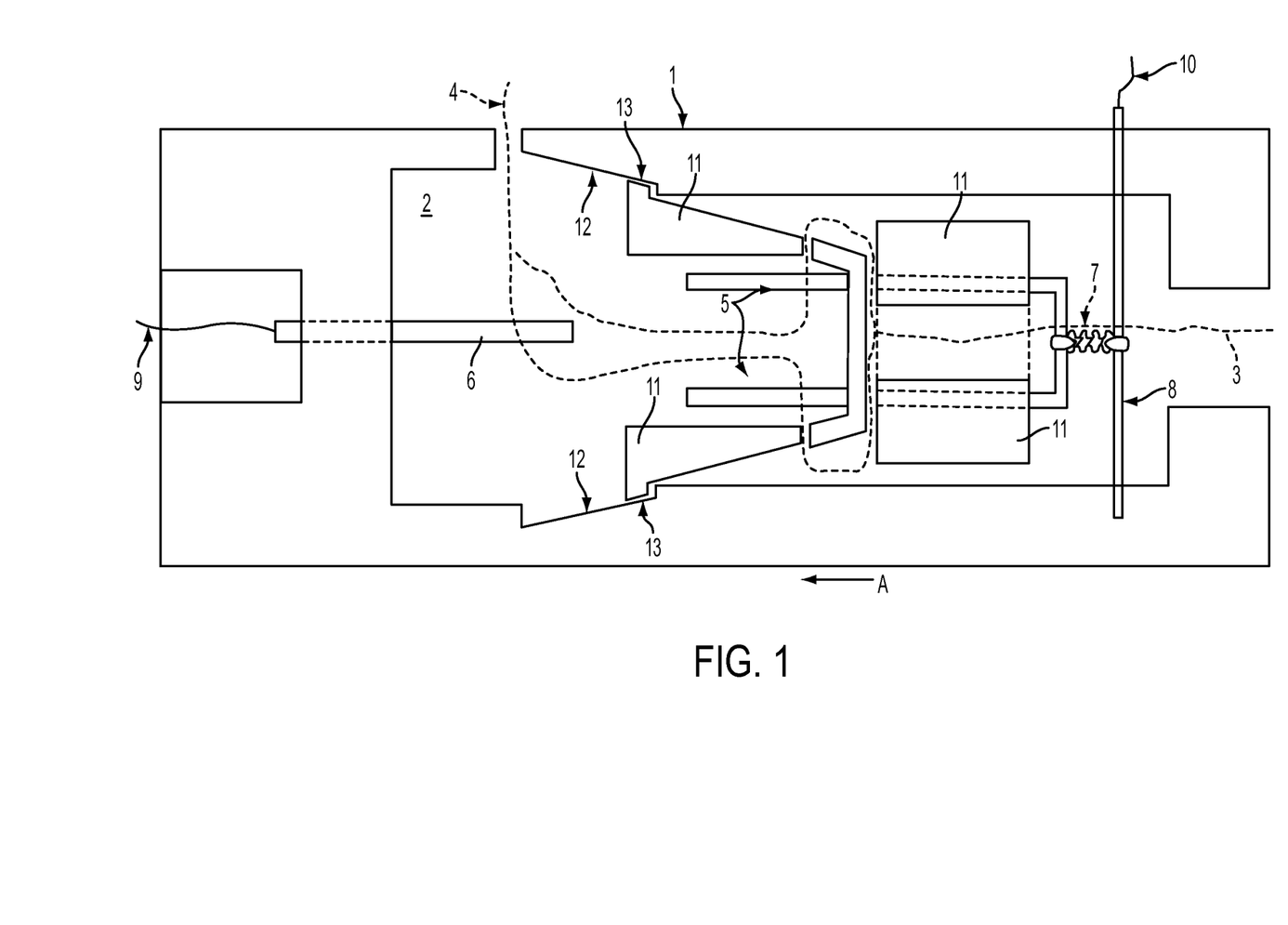
FIG. 1 is a diagrammatic sectional side elevation of a fluid processing apparatus according to a preferred embodiment of the present invention and suitable for use in performing the method of the present invention.
Figure 3A:
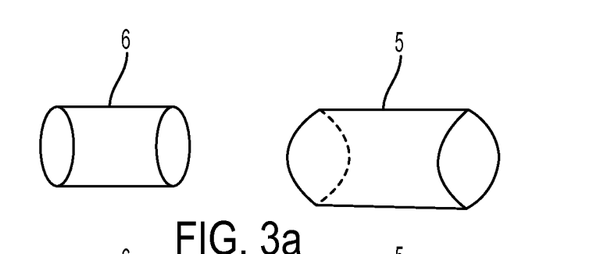
FIGS. 3a, 3b and 3c illustrate alternative electrode configurations in accordance with a further embodiment of the present invention.
Figure 3B:
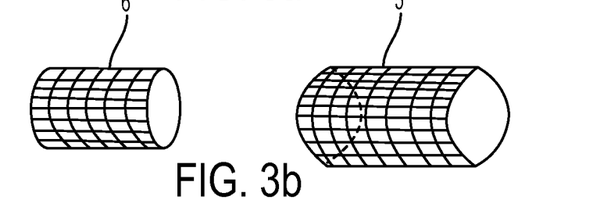
Figure 3C:
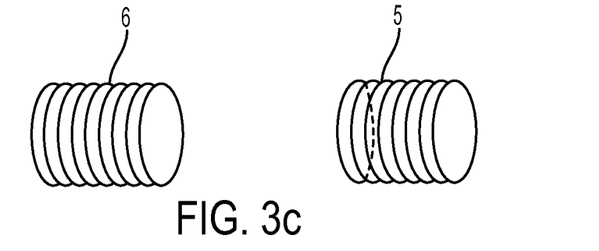

Referring to FIG. 1, a fluid processing unit is shown generally as 1. The fluid processing unit 1 may be an ion disinfection apparatus or equally, a fluid flow determination apparatus and is defined by a body having a chamber 2 formed with a spaced inlet 3 and an outlet 4 respectively at opposite ends of the chamber 2. The outlet 4, or possibly more than one outlet, may be situated so as to breach the wall of chamber 2 whereby the fluid may be caused to flow from inlet 3 to outlet 4. Within the unit 1 shown in FIG. 1, the first electrode arrangement comprises a single silver electrode 6 and the second electrode arrangement comprises two silver joined electrodes 5. The electrodes are shown as rods or bars, however, they may be of any suitable shape or a combination of shapes. For example, one, a part of one or each of the electrodes may be a hollow tube as illustrated in FIG. 3a, a mesh or grid-like configuration as illustrated in FIG. 3b, and/or a helical-like or ring-like configuration as illustrated in FIG. 3c. The joined electrodes 5 are mounted moveably by virtue of housing or support 11 adjacent the inlet opening 3. In the embodiment shown, the housing is a piston-like structure, having apertures selected according to the fluid type which passes through the chamber 2. The size of the piston or apertures can be selected or varied as required according to the type of fluid passing through the chamber. In other words, if the fluid is relatively viscous, a smaller piston and/or larger apertures or more apertures may be provided, whereas if the fluid has less viscosity, a larger, more tightly fitting piston and/or smaller or reduced number of apertures may be used. Not only can the piston size vary, the aperture size (where fluid flows into the chamber) and/or the size and/or tension of the spring may also vary.

The assembly of joined electrodes 5 is biased by a biasing means 7 and 8, such as light stainless steel tension spring or other suitable biasing means 7 held by an anchor 8, operatively associated with a housing or support 11 for the electrodes 5 to occupy a position in which the assembly retracts from an electrolysing position in the case of fluid flow to a position remote from electrode 6 when the flow of fluid reduces or ceases. Assembly 11 is adapted to be moved, by the flow of fluid, against the action of the spring 7 by incoming fluid so that the fluid will enter and pass through the chamber 2. As illustrated, the parts are made and arranged such that movement or displacement of the electrode assembly 5 against the action of the spring 7 will cause a normally greater distance between electrode assembly 5 and electrode 6, which is in a normally fixed position, to decrease. It would be recognised by the person skilled in the art that the portion of the chamber 2 comprising the electrode assembly 5, stationary electrode 6 and the fluid therebetween forms an electrolytic cell. It would also be recognised by a person skilled in the art that the relative movement of the electrode is important, not necessarily which electrode moves or is stationary. For example, an arrangement may be envisaged where electrode 5 may be made to be stationery, and electrode 6 may be mounted in a moveable manner.

Figure 2:
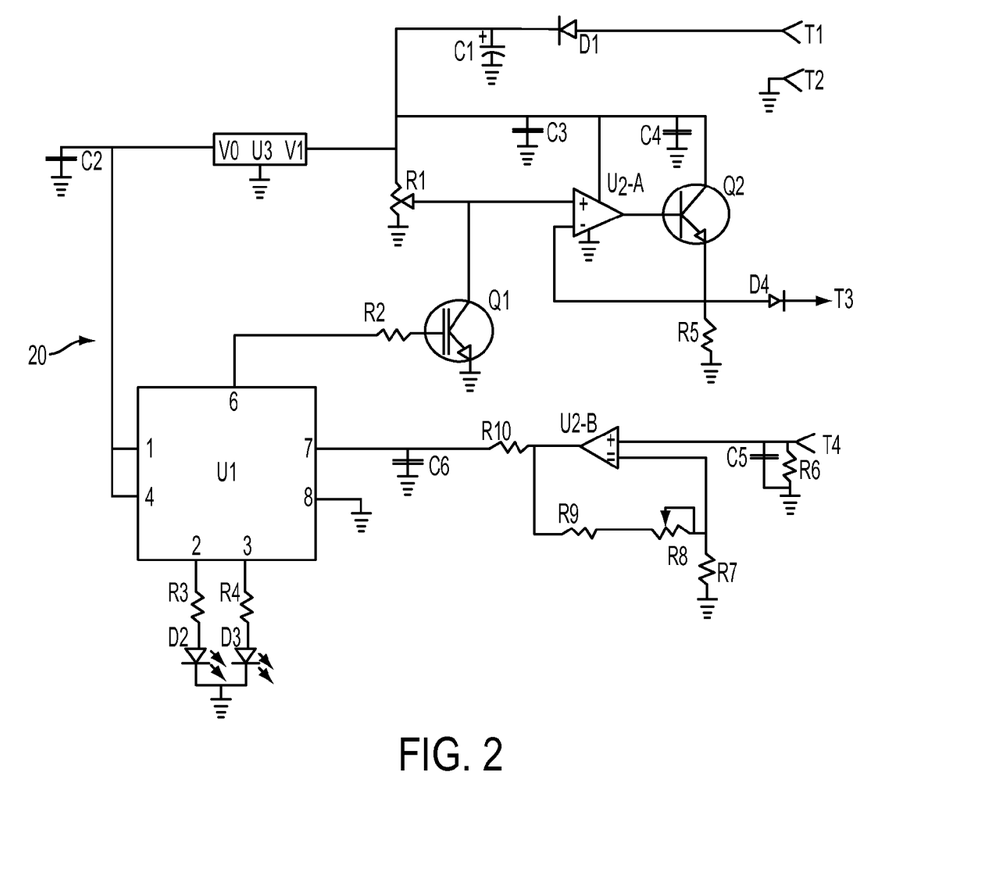
FIG. 2 is a circuit diagram illustrating, in part, an electric circuit according to a preferred embodiment of the present invention.

The circuit 20 of FIG. 2 will detect an increase in electron flow within its wired circuit path as the distance between electrode assembly 5 and electrode 6 decreases and once the electron flow exceeds preferably 2 milliamps, the circuit 20 of FIG. 2 will apply a potential difference between electrode assembly 5 and electrode 6. Electrode assembly 5 will be displaced so that a force due to the flow of the fluid is balanced by a force due to the tension in the spring 7. At a given potential difference, as electrode assembly 5 is displaced toward electrode 6, the current flowing between the electrodes increases due to the reduced resistance between the electrodes of 5 and 6. This in turn translates to a greater silver ion production or ion current density increasing in concentration as the increase in flow of the fluid causes the moveable electrode assembly 5 to lessen the distance between electrode arrangements 5 and 6. As the fluid flow decreases, the distance between the electrodes of assembly 5 and electrode 6 becomes greater lessening the amount of silver production from the electrodes and corresponding to a decreased ion current density. The electrical supply to the aforementioned moveable electrodes 5 may be connected to a spring anchor 8 via electrode lead 10. The electrical supply may correspondingly also be connected to electrode 6 directly from electrode lead 9. It would be recognised by the person skilled in the art that measurement of the ion current density between electrodes 5 and 6 provides a corresponding measurement of the fluid flow rate under these conditions. Equally, it would be recognised that the anchor 8 and spring 7 need not be conductive, if the electrical connection 10 is made directly to the electrode 5, via an electrical connection, wired or otherwise (not shown) directly to the electrode 5.

Electrode assembly housing or support 11 is substantially cylindrical and provided with a guided displacement means and has a clearance within chamber 2. The aforementioned light tension spring 7 may be anchored by anchor 8 which is of non-electrolysing but conductive metal element, preferably, grade 316 stainless steel. Once fluid enters chamber 2 via inlet 3 and tension is applied to spring 7 an electrical contact is made via spring 7 from anchor 8 to electrodes in electrode assembly 5. A standby pulse as described in more detail below from the circuit 20 of FIG. 2 may check for any ion current flow between electrodes of assembly 5 and electrode 6 preferably every two to five seconds. Once a current flow of preferably 2 milliamps is present, then the circuit 20 of FIG. 2 applies a current flow between the electrodes 5 and 6. When electrode assembly 5 is at a normally standby position (without a flow of fluid) the current flow between electrodes 5 and 6 will be less than 2 milliamps and the circuit 20 of FIG. 2 will prevent any current from flowing between said electrodes by acting as a gate. At this stage of operation, the circuit 20 of FIG. 2 may commence a test pulse preferably every two to five seconds to monitor the activity of the apparatus.

The method of operation of the apparatus and the apparatus itself comprising the normal operating and standby mode is now described in further detail in accordance with a preferred embodiment of the invention, which provides a method and apparatus for silver ion disinfection of water with reference to the accompanying drawings. The water disinfection apparatus of FIG. 1 provides a body or chamber 2 defining a fluid flow passage formed between inlet 3 and outlet 4. A minimum of one electrode 6 is mounted stationary with respect to the chamber 2 for the flow of water to pass over it in its passage from the inlet opening 3 to the outlet opening 4. A minimum of one and preferably two electrodes 5 are mounted to or supported by a displaceable or moveable housing, preferably a sliding piston 11, arranged so that its outer end has the electrodes 5 exposed. One or all of the electrodes 5, 6 are preferably made of silver. Of course, other electrodes may be used where a specific type of ion is required to be dispersed into the fluid.

Figure 4:
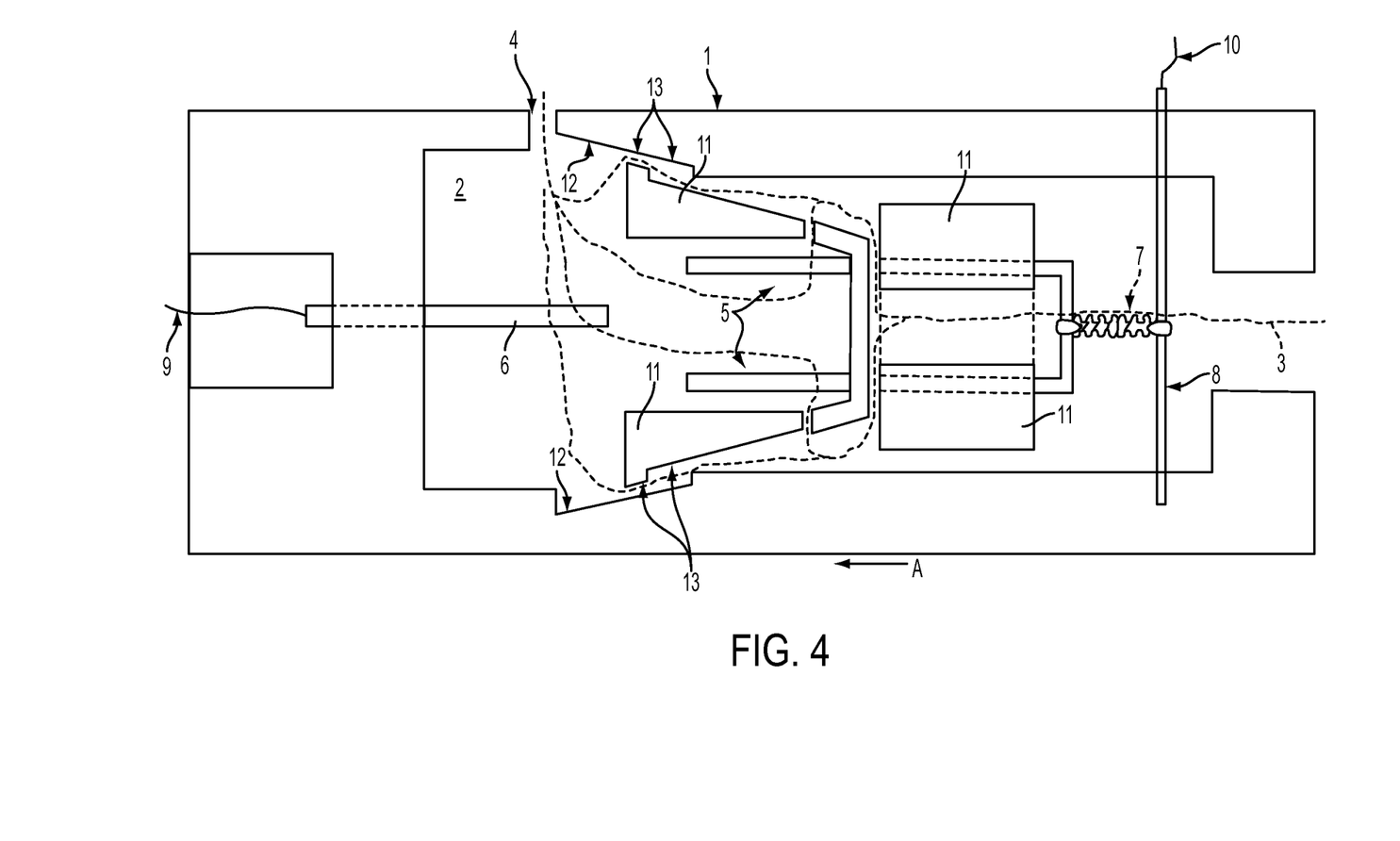
FIG. 4 illustrates a fluid processing apparatus according to a preferred embodiment of the present invention operational' in an increased fluid flow situation.

In FIGS. 1 and 4, a path travelled by the fluid flowing is indicated by dotted lines. Fluid enters the chamber 2 at inlet 3. The fluid passes the biasing means, anchor 8 and spring 7. The fluid passes through the sliding piston 11 and passes over or proximate the exposed electrodes 5. As the flow of fluid increases, the fluid enters the chamber 2 via inlet 3 and provides a force against housing 11. The housing via its piston 11 moves (as well as the two attached exposed electrodes 5) in a direction. 'A' towards and in closer proximity to the aforementioned stationary electrode 6. A DC power supply having terminals denoted by T1 and T2 in FIG. 2, is connected via the circuit 20 of FIG. 2, to the electrodes 5 and 6 for the production of ions via electrolysis. The fluid passes the electrodes 5 and 6 and exits via outlet 4. As shown in FIG. 1, little or no fluid flow passes region 13.

The circuit 20 of FIG. 2 is coupled to the electrodes 5 and 6 and may act as a gate to prevent current leakages of less than around 2 milliamps from activating the production of sliver ions. The same circuit 20 makes a current above around 2 milliamps available to the electrodes 5 and 6 and may incorporate a reversing polarity for the cleaning of the electrodes 5 and 6.

As the piston 11 holding the two electrodes 5 is moved towards the fixed or stationary electrode 6, a current draw above 2 milliamps is created allowing the activation of electrolysis hence producing silver ions. The closer the piston 11 is moved toward the fixed electrode 6 by the greater flow of water, the greater the current draw and hence, the greater amount of silver ions produced. In order to enable this larger fluid flow to pass through the chamber 2, frusto-conical or other suitably shaped recesses 12 are provided.

Referring to FIG. 4, the housing 11 and its associated electrode 5 is shown displaced more closely toward the electrode 6 than that shown in FIG. 1. This is the situation caused by increased fluid flow through the chamber 2. It can be seen spring 7 is more extended than as shown in FIG. 1, and that a gap 13 has enlarged or emerged to assist in allowing the increased fluid flow to pass through the chamber 2. The fluid passing gap 13 and passing the electrodes 5 and 6 is converged or mixed as it passes the outlet 4.

Again, the fluid path is indicated by way of a dotted line. The fluid flow passes into the chamber 2 via inlet 3. The fluid then passes piston 11, and a portion passes into and around electrode 5, whereas another portion passes through gap 13. The fluid also passes electrode 6 and exits via outlet 4.

The type and rate of ions being produced has been predetermined according to the kind of electrodes used and the type of fluid passing through the chamber 2, respectively.

Alternatively, any one or a combination of a number of adjustments may be made to the chamber or it components in order to set or regulate the quantity of ion production for a given fluid flow. For example:

the spring tension may be adjusted, thereby adjusting the displacement of the electrodes relative to each other;
  the electrical supply or circuit 20 may be appropriately adjusted to provide more or less ion production by increasing or decreasing the electrical energy supplied to the electrodes;

alternative electrodes, such as titanium electrodes may be provided for use as stable electrodes in fluid flow measurement, or a combination of titanium and other metals that easily produce ions, for example, Magnesium, Copper, Zinc, Silver;

a number of electrodes may be provided in the chamber enabling a selection or combination of electrodes to be activated thus providing a selection or combination of ions being provided into the fluid;

the gap 13 may be adjusted by means of a screw or other displacement means to either increase the gap (thus decreasing the force as applied to the housing 11 by the inlet fluid and thus decreasing the movement of the housing and electrode 5 relatively to electrode 6) or to decrease the gap (thus increasing the force applied to housing 11 by the inlet fluid and thus increasing the displacement of electrode 5 toward electrode 6) and increasing the production of ions;

the housing 11 may be adjustable and either expanded or contracted within the chamber, thus restricting or increasing fluid flow past the housing.

As the piston 11 holding the two electrodes 5, which may be fixed to a stainless steel spring 7, retracts due to the loss of water flow, the gap 13 will decrease, the current draw is less and thus produces a lesser amount of silver ions. The ion flow may be in direct proportion to the fluid flow rate. However, there is a direct relationship between ion flow and the conductivity of the fluid. For example, more ions in salt water and less ions in tap water. Equally, the rate of ion production may be predetermined in accordance with the type of fluid or environment of use of the present invention. In this way, the present invention provides a relatively steady concentration, or a proportional amount, of ions to the fluid as it passes through the chamber 2. Any other desired circuit for the production of metal particles other than silver and, which have anti microbial properties, may be fitted after the aforementioned controllable gate circuit 20.

Figure 5:
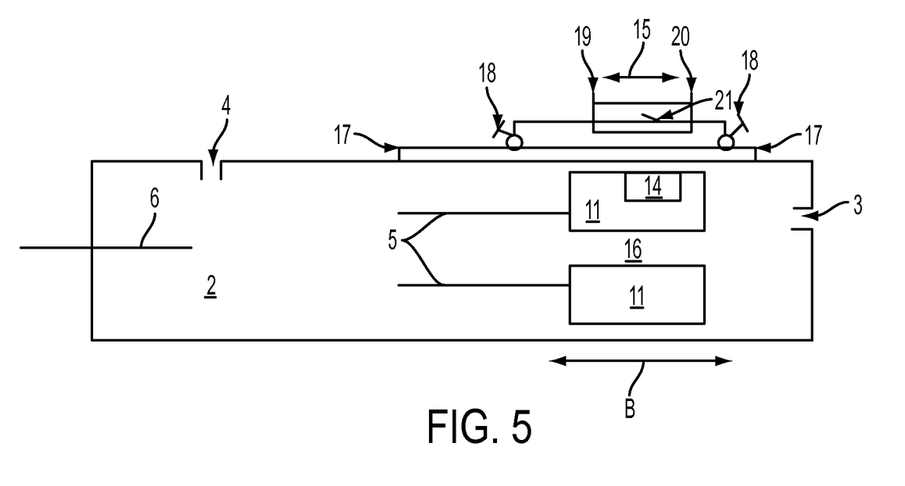
FIG. 5 illustrates an adjustable reed switch and magnetic trigger configured in accordance with a further embodiment of the present invention.

The present invention may also involve electrolysis being activated or deactivated using a magnet and reed switch. The activation and/or deactivation of electrolysis may be provided by any suitable flow switch that is available in the market place such as those comprising a magnet and reed switch. FIG. 5 illustrates one embodiment of the present invention incorporating an improved adaptation of such a configuration. The chamber 2 has an inlet 3 and outlet 4 for fluid ingress and egress, respectively. Electrodes 6 and 5 are provided. Housing 11 provides a mechanism by which electrode 5 can be displaced either toward or away torn electrode 6. Suitable biasing means (not shown) are also provided for the housing. A fluid pathway 16 is provided through which fluid can pass the housing 11 and circulate proximate the electrodes 5 and 6 and exit via outlet 4. In accordance with this aspect of invention, a magnet 14 is provided in housing 11. A reed switch 15 is provided on an adjustable mounting 17, and which can be held fixed permanently or temporarily by locking means 18. In accordance with this aspect of invention, the reed switch 15 can be moved in direction B to a position where the magnet force of magnet 14 closes or opens the reed switch once the housing 11 has moved a predetermined amount. In other words, given that the housing 11 moves in direction B dependent on the fluid flow, the reed switch 15 can also be moved to a position where it is required that the switch close or open (by virtue of the magnetic force of magnet 14 acting on the switch elements 21 internal of the reed switch). Once the internal reed switch elements 21 are acted upon by the magnet force, corresponding electrical connects 19 and 20 can be made to external circuitry, such as that of FIG. 2 to supply electrical power to the electrodes 5 and 6.

In using this aspect of invention, for example when there is no fluid flow through the chamber, the reed switch 15 may be moved to a position where the magnetic force of magnet 14 closes the reed switch. Thus when there is no fluid flow, the reed switch elements 21 are closed. In such an arrangement, when fluid is passed through the chamber 2, the housing 11 (and it's associated magnet 14) move toward electrode 6 as described above. This movement may cause reed switch elements 21 to be no longer in a closed position due to the magnetic force of magnet 14, and thus the reed switch 15 will provide an indication of when fluid flow is occurring in the chamber 2. This indication may be used to trigger an electrical circuit (not shown) to supply electrical power to the electrodes 5 and 6. Conversely, the reed switch 15 may be moved proximate the magnet 14 so as the internal elements 21 remain in an open circuit position until the housing 11 moves and the magnetic force of magnet 14 closes the internal elements 21. This closing may alternatively be used as an indication of fluid flow and the need to supply electrical power to the electrodes.

In a preferred embodiment of the present invention when a flow switch is not used to activate or deactivate electrolysis, the electronic circuit 20 of FIG. 2 may be utilised to determine water flow activity. This feature of the present invention allows for fully automatic operation under micro-control. The amount of silver electrolysed into the water is a function of both the current density of the water and the water flow rate. The current density regulating method of the present invention is able to accurately maintain the correct levels of electrolysed silver in the water to be treated under varying flow rates and conditions and, in accordance with a preferred embodiment, is able to activate or deactivate the electrolysing process under no flow conditions. Not pertaining to reed switches or other flow switches the operation of the circuit 20 that provides an alternative to the activation and deactivation of electrolysis for the present invention is described as follows with reference to FIG. 2.

The circuit 20, acting as a gate, is supplied with regulated DC voltage across power supply input terminals T1 and T2. Circuit element D1 provides reverse polarity protection for the circuit 20 and capacitor C1 provides filtering from noise and transients. Integrated circuit U3 and capacitor C2 provide the microprocessor U1 with a regulated 5V DC supply source. Variable resistor R1 provides an adjustable voltage input to the positive input of operational amplifier U2-A. Operation amplifier U2-A is configured as a unity gain buffer with transistor Q2 inside of the feedback loop. Capacitor C3 provides a power supply bypass for operational amplifier U2-A and capacitor C4 provides a bypass for the collector transistor Q2. Transistor Q2 is configured as voltage follower and provides the necessary positive current to electrolyse the silver through terminal T3 via blocking diode D4.

Resistor R5 provides a resistive load to the emitter of Q2 to ensure the circuit will perform properly regardless of whether there is a load present or not at T3. Blocking diode D4 ensures that any galvanic voltage created by the water processing unit 1 does not result in any substantial current flaw through the unit 1. Without the blocking diode D4 the internally generated galvanic voltage of the unit 1 will continue to electrolyse the silver into the water, potentially above safe levels during long periods of no water flow.

The current return path of circuit 20 consists of terminal T4 and current shunt resistor R6 the other end of which is connected to circuit ground. Capacitor C5 provides filtering for any high frequency AC noise components. Operational amplifier U2-B is configured as a non-inverting variable gain amplifier. The feed back loop comprises resistors R9, R8 and R7. Resistor R8 is a potentiometer and enables the circuit 20 and thus the water processing unit 1 overall to be calibrated for the selected operating set point. The amplified current sense voltage is filtered by the RC low pass filter network consisting of R10 and C6 and is applied to an analogue to digital converter input of the microprocessor U1 at pin 7 thereof, as illustrated in FIG. 2. The circuit 20 is calibrated by adjusting R1 to give the desired current flow at the maximum water flow rate. The current threshold level is calibrated with resistor R8. The current threshold value is selected to be nominally higher than the current drawn by the unit 1 in the no fluid flow condition. Under normal operating conditions the circuit 20 applies the full current source voltage to the unit 1 and the current is modulated relative to the rate of water flow through the unit 1 by means of the water flow rate modulating the relative displacement of the electrodes, as has been previously described. When the water flow through the unit 1 is terminated the current will fall below the low current threshold programmed into microprocessor U1 which then increments an internal timer as long as the current is below the low current threshold. The micro processor U1 continually checks the amount of time that the currant has been below the low current threshold and when the predetermined amount of time has been accumulated activates transistor Q1 which effectively shunts the output of voltage divider resistor R1 to ground effectively reducing the current flowing through the unit 1 to zero to effect a standby mode. The timer measures a continuous time period of current being below the predetermined threshold value to activate the standby mode and will reset the tinier to zero should normal system current levels be detected before the predetermined threshold low current time is accumulated. While the unit 1 is in the standby mode controllable circuit 20 samples the unit 1 for fifty milliseconds every five seconds to sense if the current has again increased indicating that water flow through the unit 1 has been resumed. The threshold to indicate the unit 1 is again in active use or normal operating mode is purposely made higher by a small amount to provide some hysteresis in the function of the device to ensure that it does not reach a threshold condition where it would toggle continually between the two operating states. The sampling method results in a duty cycle of one percent, which would allow for normal periods of non use with complete confidence that the silver levels in the water would not rise above generally accepted or regulated safe levels. The controllable circuit 20 is equipped with red LED D2 powered through current limiting resistor R3 from the microprocessor U1 and a green LED D3 powered through current limiting resistor R4 from the microprocessor U1 to provide a visual indication to the user of whether the unit is in the standby or operating mode.

A further embodiment is contemplated in respect of the present invention, particularly for application to gases, but may be adapted for use with fluids in general.

With regard to use of the present invention with gases, ion production will occur for those gases that cart produce a resistance between the electrodes. Thus, for these gases ions are introduced into the flow or equally measurement of flow can be deduced in this case. For gases that do not produce resistance between the electrodes, then ion introduction won't occur but they can be used for fluid flow measurement. In the use with gases, it is considered that the embodiment needs to "reconfigure" the electrodes only in as much as they are very near or touching to produce the required electrolysis.

Alternatively with regard to gases, disinfectant sliver can be produced in solution as per the normal liquid case disclosed above. This silver colloid solution may then be vaporised downstream in another chamber removing the liquid and leaving the silver particles to be mixed in with a given gas. This produces a liquid with the desired form of silver, namely colloid, as well as a given gas also having silver particles for use in an airborne form of treatment of the ambient environment. For example, silver of a first form can be produced, introduced into the liquid, then have the liquid treated downstream further (for example by vaporising the liquid), leaving the first form of the silver. This first form of silver can then be added to a gas, to provide, for example, an 'aerosol form' or atomising form of silver.

Furthermore, with regard to gases, in another alternative, the device of the present invention can be calibrated with a standard liquid and having done this the desired gas can be introduced into the upstream liquid flow and a controlled quantity of metal ions can be introduced in to the liquid plus gas solution flowing through the chamber. This can be used to deliver an example gas such as steam, which is considered to be particularly effective for the hospital environment application.

Yet a further alternative embodiment is contemplated. A stepper motor or other device may be used to move the piston mechanically, and/or in response to a control signal provided by suitable control circuitry. For example, where the fluid flow is low, or is not considered suitable to move the piston against the action of a spring (as is described above with reference to the figures), this embodiment may be used to bias or displace the piston to a position which will enable the passage of a predetermined amount of fluid through the chamber. The electrodes may also or in the alternative be displaced or biased toward each other. Also, the electrodes can be activated in a manner consistent with the nature of the fluid and the rate of flow of the fluid. For example, the stepper motor control may be determined in accordance with a look-up table which specifies the type of fluid, the required electrode biasing, and the biasing of the piston. For example where it is desired to pass a gas/fluid of low pressure through the chamber, the piston may be biased a predetermined amount, the electrode(s) activated according to the desired ion discharge required, and the piston moved to a predetermined position consistent with that particular type of gas/fluid.

The present invention may be used in a number of applications, stroll as:
   domestic/home—for use in home, such as for producing drinking water;
   recreation—for use in recreation activities, such as for use in spas and pools;
   commercial—for use in offices, such as controlling heterotropic bacteria;
   building—for use in cooling towers, such as by reducing or eliminating *Legionella* bacteria and reduce use of harsh chemicals;
   bulk water treatment—for use in treating water for re-use;
   industrial—for use in providing water with substantially little if any bacteria;
   dental—for use in dealing with bio-film.
   Food industry—for washing fruit and vegetables.
   Marine industry—treatment of ships ballasts. Normally, within the hull of a marine vessel there is an ideal environment for bacteria growth given the supply of Fe oxide and oxygen. After treatment with the present invention a ship may be able to dump its ballast in or near port waters where otherwise the levels of organically harmful material would have prevented a ship form doing this.

Medical—cleaning and washing of hospital atmosphere and environment.

General industry—measuring and detecting fluid flow in domestic, commercial and industrial environments.

Application in the medical field has been generally noted above. However, it has been shown that a particularly advantageous application in the medical field is the introduction of silver ions into a flow of water for disinfecting hospital environments by destroying harmful bacteria that may reside in the atmosphere end on hospital room surface's and equipment, for example, oxygen masks. Typical bacteria shown to have bean successfully treated comprise most widely known bacteria that thrive in the hospital environment including staphylococcal or "golden staph". To achieve this, water may be passed through the apparatus of the present invention to produce silver colloids as a resultant output of the electrolytic cell of the apparatus. This colloid solution containing the disinfecting silver in controlled amounts may then be atomized and introduced into the hospital environment, for example through an air conditioning system. Equally, as previously described herein, steam may be used under controlled introduction of colloidal silver. Introducing the disinfecting silver under such higher temperature conditions has been shown to be particularly effective.

The present invention may provide a number of advantages, including:

fluid treatment is substantially proportional to fluid flow rate;

where silver electrodes are used, the controlled introduction of ions is such that only the desired amount (and therefore, form) of silver ions is produced, thus without excess silver ions present, the silver may not readily form salts, moreover, the silver, in its colloidal form is not readily absorbed by humans or animals;

where silver electrodes are used, the present invention has been found effective in substantially removing and substantially preventing formation of bio-film;

treated fluid can go on to treat other fluid (second generation treatment);

where silver electrodes are used, dangerous compounds are not formed when organic material 'rots'. Ordinarily, under these conditions, organic acids from the rotting material combine with chlorine derived from water treated with prior art methods such as chlorination, and produce trihalomethanes THM's. These compounds are known carcinogens and have been banned where possible under regulation. Thus, it would be particularly advantageous to replace chlorination as a treatment for water;

where silver electrodes are used, treated fluid reduces leaching of organochloride compounds from PVC pipes;

where silver electrodes are used, silver can replace chlorine;

where silver is used, the treated fluid may also catalyse and carry O⁻ (nascent oxygen having beneficial health and environmental effects) produced from, say, $H_2O_2$ and remain stable in the fluid bonded to the silver.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the present invention as defined in the appended claims. Various modifications and equivalent arrangements are intended to be included within the spirit and scope of the present invention and appended claims. For example, the body defining the fluid flow passage within the apparatus of the present invention is described in one embodiment herein as a chamber. Equally, the body may be an open channel defining a fluid flow passage. Such variations to the body may be more suitable than a closed channel arrangement depending on, for instance, the fluid being processed. As a further example, the biasing means should not necessarily be restricted to a coil spring as described in one embodiment herein. It would be recognised by the person skilled in the art that other biasing means provide the equivalent function and may be used as a substitute.

Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

What is claimed is:

1. Apparatus for processing fluid comprising:
a body defining a fluid flow passage having a fluid inlet and a fluid outlet, the body comprising a first electrode arrangement and a second electrode arrangement displaceable with respect to the first electrode arrangement, the first and second electrode arrangements adapted for connection to a supply of electric current such that fluid within the body forms part of an electrolytic cell providing for a flow of ions between the first and second electrode arrangements;
biasing means operatively associated with the second electrode arrangement and adapted to displace the second electrode arrangement against a flow of fluid within the body in order to displace the second electrode arrangement into closer proximity with the first electrode arrangement as the fluid flow rate increases, thereby increasing the flow of ions, and to displace the second electrode arrangement away from the first electrode arrangement as the fluid flow rate decreases, thereby decreasing the flow of ions.

2. Apparatus as claimed in claim 1, wherein the first electrode arrangement comprises an electrode fixed relative to the body and the second electrode arrangement comprises two opposed electrodes, mounted within a moveable support, allowing for positioning of-the fixed electrode therebetween.

3. Apparatus as claimed in claim 2, wherein the moveable support comprises a piston and at least one of the electrode arrangements comprises silver for producing a flow of silver ions between the electrodes.

4. Apparatus as claimed in claim 1, wherein, the biasing means comprises a spring connected to the body means.

5. Apparatus as claimed in claim 1, wherein the ions are metal ions having antimicrobial and plating out properties such that the metal ions plate to fluid contact surfaces of the body and fluid carrier means located beyond the body to form a biostatic film on the fluid contact surfaces.

6. Apparatus as claimed in claim 1 further comprising an electric circuit for supplying electric current to the electrolytic cell.

7. Apparatus as claimed in claim 6 further comprising:
fluid flow measurement means for determining whether there is actual fluid flow between the inlet and the outlet of the body, and wherein;
the electric circuit for supplying electric current to the electrolytic cell comprises circuit control means for reducing the electric current supplied to the first and second electrode arrangements if there is no actual fluid flow determined by the fluid flow measurement means.

8. Apparatus as claimed in claim 7 wherein the fluid flow measurement means comprises a flow switch having a magnet and a reed switch.

9. Apparatus as claimed in claim 6, wherein the electric circuit comprises circuitry for activating a standby mode comprising:
an operational amplifier circuit in a current return path of the electric circuit adapted to detect a no fluid flow current threshold level selected to be nominally greater than a galvanic current drawn by the electrolytic cell when there is no fluid flow in the body, the operational amplifier circuit further adapted to output a signal indicating a no fluid flow condition upon detecting the no fluid flow current threshold level;
a micro-controller adapted to receive output signals of the operational amplifier and, upon receiving an output signal indicating the no fluid flow condition, increment a timer within the micro-controller for a predetermined continuous period of time at the end of which, if the no fluid flow condition remains, the micro-controller is further adapted to activate the standby mode by activating a circuit shunt means within the electric circuit to reduce the electric current supplied to the first and second electrode arrangements.

10. Apparatus as claimed in claim 9, wherein the electric circuit further comprises circuitry for activating an operating mode comprising
the operational amplifier circuit adapted to detect a fluid flow current threshold level selected to be nominally greater than the no fluid flow current threshold level, the operational amplifier circuit further adapted to output a signal indicating a fluid flow condition upon detecting the fluid flow current threshold level;
sampling means for periodically sampling the output of the operational amplifier circuit at the micro-controller during the standby mode;
circuit means for increasing an electric current supply to the first and second electrode arrangements in response to the micro-controller receiving a sampled output signal from the operational amplifier circuit indicating the fluid flow condition.

11. A method of processing a fluid comprising the steps of:
providing a body defining a fluid flow passage having a fluid inlet and a fluid outlet, the body comprising a first electrode arrangement and a second electrode arrangement displaceable with-respect to the first electrode arrangement, the first and second electrode arrangements adapted for connection to a supply of electric current such that fluid within the body forms part of an electrolytic cell providing for a flow of ions between the first and second electrode arrangements;
providing an electric current supply from an electric circuit to the first and second electrode arrangements;
passing the fluid through the body such that the displacement of the second electrode arrangement is biased against the flow of fluid within the body in order to displace the second electrode arrangement into closer proximity with the first electrode arrangement as the fluid flow rate increases, thereby increasing the flow of ions, and to displace the second electrode arrangement away from the first electrode arrangement as the fluid flow rate decreases, thereby decreasing the flow of ions.

12. A method as claimed in claim 11, further comprising the steps of
determining whether there is actual fluid flow between the inlet and the outlet of the body; and
reducing the electric current supplied to the first and second electrode arrangements if there is no actual fluid flow determined in the actual fluid flow determining step.

13. A method as claimed in claim 12, wherein the actual fluid flow determining step comprises the use of a flow switch and wherein the flow switch comprises a magnet and a reed switch.

14. A method as claimed in claim 11, further comprising activating a standby mode comprising the steps of:
determining a no fluid flow condition by adapting an operational amplifier circuit in a current return path of the electric circuit to detect a no fluid flow current threshold level selected to be nominally greater than a galvanic current drawn by the electrolytic cell when there is no fluid flow in the body;
providing an output signal of the operational amplifier circuit to a micro-controller;
upon receiving an output signal of the operational amplifier circuit indicating the no fluid flow condition, incrementing a timer within the micro-controller for a predetermined continuous period of time at the end of which, if the no fluid flow condition remains, the micro-controller activates the standby mode by activating a circuit shunt means within the electric circuit to reduce the electric current supplied to the first and second electrode arrangements.

15. A method as claimed in claim 14, further comprising activating an operating mode comprising the steps of:
determining a fluid flow condition by adapting the operational amplifier circuit to detect a fluid flow current threshold level selected to be nominally greater than the no fluid flow current threshold;
periodically sampling the output of the operational amplifier circuit at the micro-controller during the standby mode;
upon receiving an output signal of the operational amplifier circuit indicating the fluid flow condition, the micro-controller deactivates the circuit shunt means to resume the electric current supplied to the first and second electrode arrangements.

16. A method as claimed in claim 11, wherein the ions are metal ions having antimicrobial and plating out properties such that the metal ions plate to fluid contact surfaces of the body and fluid carrier means located beyond the body to form a biostatic film on the fluid contact surfaces.

17. A method as claimed in claim 11, wherein at least one of the first and second electrode arrangements comprises silver for producing a flow of silver ions between the first and second electrode arrangements.

* * * * *